United States Patent
Yoon et al.

(10) Patent No.: US 10,306,044 B2
(45) Date of Patent: *May 28, 2019

(54) METHOD AND APPARATUS FOR PREVENTING SCREEN OFF DURING AUTOMATIC RESPONSE SYSTEM SERVICE IN ELECTRONIC DEVICE

(71) Applicant: Samsung Electronics Co., Ltd., Suwon-si, Gyeonggi-do (KR)

(72) Inventors: Bong-No Yoon, Suwon-si (KR); Chul-Jin Kim, Yongin-si (KR); Hyung-Chul Son, Seoul (KR); Hyun-Seok Oh, Seoul (KR); Young-Kwon Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/488,885

(22) Filed: Apr. 17, 2017

(65) Prior Publication Data
US 2017/0223166 A1 Aug. 3, 2017

Related U.S. Application Data

(63) Continuation of application No. 14/797,615, filed on Jul. 13, 2015, now Pat. No. 9,628,982, which is a (Continued)

(30) Foreign Application Priority Data

Jul. 17, 2012 (KR) .................. 10-2012-0077997
Aug. 3, 2012 (KR) .................. 10-2012-0085372

(51) Int. Cl.
*H04M 3/42* (2006.01)
*H04M 1/725* (2006.01)
(Continued)

(52) U.S. Cl.
CPC ........ *H04M 1/72519* (2013.01); *G06F 3/017* (2013.01); *G06F 3/0346* (2013.01);
(Continued)

(58) Field of Classification Search
CPC ..... H04W 8/245; H04W 52/027; H04W 8/22; H04M 1/72519; H04M 1/72522;
(Continued)

(56) References Cited

U.S. PATENT DOCUMENTS 6,137,883 A * 10/2000 Kaschke ............. H04M 1/0202
379/433.07
8,289,438 B2 * 10/2012 Yeh ........................ H04N 5/217
348/208.12
(Continued)

FOREIGN PATENT DOCUMENTS

KR 10-2011-0034264 A 4/2011

*Primary Examiner* — Danh C Le
(74) *Attorney, Agent, or Firm* — Jefferson IP Law, LLP

(57) ABSTRACT

A method of avoiding screen off during an Automatic Response System (ARS) service is provided. The method includes enabling a proximity sensor in a call connection, detecting one of a first gesture and a second gesture during a call, and upon detecting the first gesture, disabling the proximity sensor.

20 Claims, 17 Drawing Sheets

Related U.S. Application Data continuation of application No. 13/923,893, filed on Jun. 21, 2013, now Pat. No. 9,173,086.

(51) Int. Cl.

| | |
|---|---|
| *H04W 8/22* | (2009.01) |
| *G06F 3/0488* | (2013.01) |
| *H04M 1/67* | (2006.01) |
| *H04W 52/02* | (2009.01) |
| *G06F 3/01* | (2006.01) |
| *G06F 3/0346* | (2013.01) |

(52) U.S. Cl.
CPC ............ *G06F 3/0488* (2013.01); *H04M 1/67* (2013.01); *H04W 8/22* (2013.01); *H04W 52/027* (2013.01); *H04M 2250/12* (2013.01); *H04M 2250/22* (2013.01); *Y02D 70/00* (2018.01); *Y02D 70/1262* (2018.01); *Y02D 70/142* (2018.01); *Y02D 70/144* (2018.01); *Y02D 70/146* (2018.01); *Y02D 70/164* (2018.01)

(58) Field of Classification Search
CPC ........ H04M 1/67; G06F 3/0148; G06F 3/017; G06F 3/0346; G06F 3/0488
USPC ................... 455/418, 550.1, 556.1; 345/173; 379/433.37
See application file for complete search history.

(56) References Cited

U.S. PATENT DOCUMENTS

| | | | | |
|---|---|---|---|---|
| 8,699,963 | B2* | 4/2014 | Chen ....................... | H04M 1/03 455/74 |
| 2005/0003793 | A1* | 1/2005 | Goris ....................... | H04M 1/22 455/347 |
| 2008/0057926 | A1* | 3/2008 | Forstall ................... | G06F 3/0482 455/415 |
| 2008/0168361 | A1* | 7/2008 | Forstall ................... | G06F 3/0488 715/753 |
| 2009/0153490 | A1 | 6/2009 | Nymark et al. | |
| 2009/0194341 | A1 | 8/2009 | Nousiainen | |
| 2009/0197615 | A1 | 8/2009 | Kim et al. | |
| 2009/0254339 | A1* | 10/2009 | Seguin ..................... | H03G 9/005 704/212 |
| 2010/0090854 | A1 | 4/2010 | Yin | |
| 2010/0146318 | A1* | 6/2010 | Johnson .................. | G01R 31/3624 713/340 |
| 2010/0300771 | A1* | 12/2010 | Miyazaki ................. | G06F 3/0346 178/18.03 |
| 2011/0006188 | A1* | 1/2011 | Lin ........................... | G01J 1/44 250/201.1 |
| 2011/0050974 | A1 | 3/2011 | Nakai et al. | |
| 2011/0312349 | A1 | 12/2011 | Forutanpour et al. | |
| 2012/0050189 | A1 | 3/2012 | Choboter et al. | |
| 2012/0172085 | A1 | 7/2012 | Vuppu et al. | |
| 2012/0211656 | A1* | 8/2012 | Katz ........................ | G01S 17/026 250/338.1 |
| 2012/0252527 | A1 | 10/2012 | Kim et al. | |
| 2012/0303316 | A1* | 11/2012 | Juang ...................... | H03K 17/945 702/150 |
| 2013/0094668 | A1 | 4/2013 | Poulsen et al. | |
| 2013/0147712 | A1 | 6/2013 | Zhou et al. | |
| 2013/0157726 | A1 | 6/2013 | Miyazaki et al. | |
| 2013/0159989 | A1* | 6/2013 | Deckert ................... | G06F 8/65 717/172 |
| 2013/0229508 | A1 | 9/2013 | Li et al. | |
| 2013/0275899 | A1 | 10/2013 | Schubert et al. | |
| 2013/0288655 | A1 | 10/2013 | Foruntanpour et al. | |
| 2013/0315419 | A1 | 11/2013 | Chien | |
| 2013/0326499 | A1* | 12/2013 | Mowatt .................... | G06F 8/60 717/177 |
| 2015/0070140 | A1 | 3/2015 | Chakraborty et al. | |
| 2015/0077140 | A1 | 3/2015 | Chu et al. | |

\* cited by examiner

FIG.6A  FIG.6B
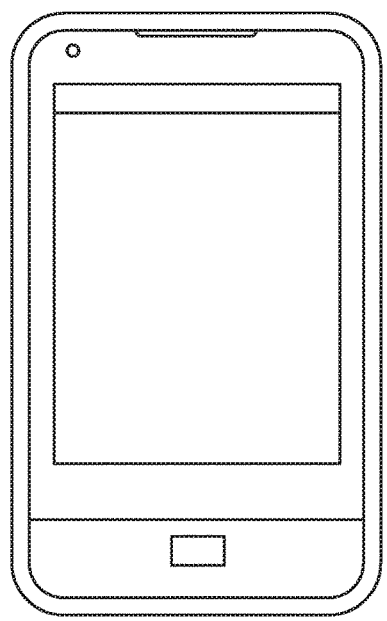
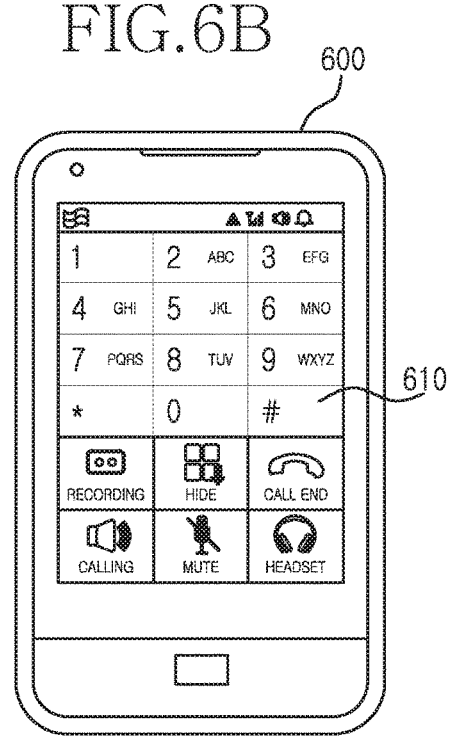
FIG.6C  FIG.6D

METHOD AND APPARATUS FOR PREVENTING SCREEN OFF DURING AUTOMATIC RESPONSE SYSTEM SERVICE IN ELECTRONIC DEVICE

PRIORITY

This application is a continuation application of a prior application Ser. No. 14/797,615, filed on Jul. 13, 2015, which will issue as U.S. Pat. No. 9,628,982 on Apr. 18, 2017, which is a continuation application of prior application Ser. No. 13/923,893, filed on Jun. 21, 2013, which has issued as U.S. Pat. No. 9,173,086 on Oct. 27, 2015 and claimed the benefit under 35 U.S.C. § 119(a) of a Korean patent application filed on Jul. 17, 2012 in the Korean Intellectual Property Office and assigned Serial number 10-2012-0077997, and a Korean patent application filed on Aug. 3, 2012 in the Korean Intellectual Property Office and assigned Serial number 10-2012-0085372, the entire disclosure of each of which is hereby incorporated by reference.

BACKGROUND OF THE INVENTION

1. Field of the Invention

The present invention relates generally to an electronic device. More particularly, the present invention relates to a method and apparatus for preventing screen off due to an operation of a proximity sensor during an automatic response system service is used in the electronic device.

2. Description of the Related Art

An Audio Response System or Automatic Response System (ARS) is a system which stores a variety of information comprising audio data in a storage device and which automatically delivers information desired by a user. The variety of information is stored in an audio format, and thus when the user accesses a system using a phone, the user is informed as to how to use the system so that the user can search for necessary information by using a sound. When the necessary information is found, the user can listen to the information. In other words, the user usually proceeds to a next step while touching one numeric character in a keypad according to a voice guidance and finally listens to the desired information.

According to the related art, an electronic device such as a smart phone employs a soft keypad which is used as an input means instead of a hardware keypad. The soft keypad is a keypad displayed on a screen. In addition, the electronic device such as the smart phone performs a "screen off" (e.g., a screen deactivation) function by using a proximity sensor to prevent a loss of electronic current of a display unit and an erroneous operation thereof during a call. For example, when the smart phone is placed close to an ear of the user to make a call, the proximity sensor located in an upper portion of the smart phone recognizes that the smart phone is proximate to the ear of the user, and thus performs the screen off function according to a sensing result of the proximity sensor. Therefore, electric current unnecessarily consumed in the display unit during the call can be decreased, and the user can avoid a case in which an end button is erroneously pressed. In general, the proximity sensor is located in an upper-right portion or an upper-left portion.

In an electronic device using a soft keypad, a user touches a button of the soft keypad which appears on a display to respond to a voice query of a synthesized sound when using an ARS service. In this case, there is a high possibility that a proximity sensor located in an upper-right portion or an upper-left portion is operated when the user touches the keypad in response to the voice query of the synthesized sound to acquire desired information. Therefore, when the user intends to press a numeric character of the soft keypad for the ARS response, a problem occurs in that the screen is turned off before the ARS response and thus a user input cannot be made.

As described above, the technique according to the related art is designed to turn the screen off by operating the proximity sensor when the smart phone is placed close to the ear of the user to make the call, for the purpose of decreasing the electric current unnecessarily consumed in the display unit during the call and for the purpose of avoiding the operation in which the end button is erroneously pressed. However, when the user presses a numeric character of a keypad in response to a synthesized sound during an ARS service, the proximity sensor may operate unnecessarily by a finger of the user. For example, when the numeric character is input by using the soft keypad during the ARS service, "screen off" may occur, which may cause inconvenience to the user.

Accordingly, there is a need for a method and apparatus for conveniently using an ARS service in an electronic device for performing a "screen off" function by using a proximity sensor to avoid an erroneous operation and a loss of electric current consumed in a display unit during a call.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for avoiding screen off during an Automatic Response System (ARS) service.

Another aspect of the present invention is to provide a method and apparatus for preventing a proximity sensor from being enabled when a soft keypad is input during an ARS response and thus can avoid a "screen off" function which is not desired by a user, thereby increasing user convenience during an ARS service.

In accordance with an aspect of the present invention, a method of avoiding screen off during a call in an electronic device is provided. The method includes performing a call serving connection by enabling a proximity sensor, detecting one of a first gesture and a second gesture during the call, and upon detecting the first gesture, disabling the proximity sensor.

In accordance with another aspect of the present invention, the method may further include, upon detecting the second gesture, enabling the disabled proximity sensor.

In accordance with another aspect of the present invention, the first gesture may correspond to a down-swing operation in which the electronic device moves up to down (e.g., a user moves the electronic device away from an ear of the user to check a screen of the electronic device). The second gesture may correspond to an up-swing operation in which the electronic device moves down to up (e.g., the user places the electronic device close to the ear of the user to make a call).

In accordance with another aspect of the present invention, the method may further include, if the second gesture is detected, turning off a screen of the electronic device and enabling the proximity sensor.

In accordance with another aspect of the present invention, the method may further include, displaying a soft keypad upon sensing the first gesture.

In accordance with another aspect of the present invention, the method may further include displaying a button for enabling the soft keypad, and selecting the button for enabling the soft keypad.

In accordance with another aspect of the present invention, the method may further include connecting a call using a phone number which is input from a user, and determining whether a call service connected based on the phone number corresponds to an ARS service.

In accordance with another aspect of the present invention, an electronic device is provided. The electronic device includes at least one processor, a memory, and at least one program stored in the memory and configured to be executed by the at least one processor, wherein the program includes an instruction for performing a call serving connection by enabling a proximity sensor, detecting one of a first gesture and a second gesture during the call, and disabling the proximity sensor upon detecting the first gesture.

In accordance with another aspect of the present invention, the program may further include an instruction for enabling the disabled proximity sensor upon sensing the second gesture.

In accordance with another aspect of the present invention, the program may further include an instruction for, if the second gesture is detected, turning off a screen of the electronic device and enabling the proximity sensor.

In accordance with another aspect of the present invention, the program further may include an instruction for displaying a soft keypad upon detecting the first gesture.

In accordance with another aspect of the present invention, the program may further include an instruction for connecting a call by using a phone number which is input from a user, and determining whether a call service connected based on the phone number corresponds to an ARS service.

In accordance with another aspect of the present invention, an electronic device for avoiding screen off during an ARS service in a portable terminal is provided. The electronic device includes a sensor module for detecting one of a first gesture and a second gesture, and a processor for disabling a proximity sensor during a call upon detecting the first gesture, wherein the first gesture corresponds to a down-swing operation in which the electronic device moves up to down.

In accordance with another aspect of the present invention, the processor may enable the proximity sensor during the call upon sensing the second gesture, and the second gesture may corresponds to an up-swing operation in which the electronic device moves down to up (e.g., a user places the electronic device close to an ear of the user).

In accordance with another aspect of the present invention, a method of avoiding screen off during an ARS service in an electronic device is provided. The method includes determining whether a call corresponds to an ARS service, if the call corresponds to the ARS service, detecting one of a first gesture and a second gesture, and upon detecting the first gesture, disabling a proximity sensor during a call, wherein the first gesture corresponds to a down-swing operation in which the electronic device moves up to down (e.g., a user moves the electronic device away from an ear of the user to check a screen of the electronic device).

In accordance with another aspect of the present invention, a method of controlling a screen of an electronic device is provided. The method includes sensing a predetermined first down-swing of the electronic device while a call is made by using the electronic device, and upon sensing the first down-swing, disabling an enabled proximity sensor included in the electronic device. In this case, because the proximity sensor is disabled, even if a new approach to the electronic device is sensed after the proximity sensor is disabled, the proximity sensor does not operate and thus a screen of the electronic device is not turned off. The method may further include enabling the disabled proximity sensor upon sensing a predetermined second gesture (up-swing) of the electronic device.

In accordance with another aspect of the present invention, a method of avoiding screen off during a cell in an electronic device is provided. The method includes connecting a call service by enabling a proximity sensor, detecting whether a specific key is input by a user during the call service, and upon inputting the specific key, disabling the proximity sensor.

In accordance with another aspect of the present invention, the method may further include enabling the disabled proximity sensor upon detecting a touch of one key in a soft keypad.

In accordance with another aspect of the present invention, the method may further include displaying the soft keypad upon inputting the specific key.

In accordance with another aspect of the present invention, a method of avoiding screen off during a call in an electronic device is provided. The method includes connecting a call service by enabling a proximity sensor, during the call service, detecting a specific proximity object using the proximity sensor, and disabling the proximity sensor if no proximity object is detected.

In accordance with another aspect of the present invention, the method may further include running a timer for enabling the proximity sensor, and enabling the disabled proximity sensor at the expiration of the timer.

In accordance with another aspect of the present invention, a method of avoiding screen off during a call in an electronic device is provided. The method includes, during a call service, detecting a specific proximate object according to a first result sensed by using another sensor, and if no proximity object is detected, disabling the proximity sensor.

In accordance with another aspect of the present invention, the method may further include enabling the disabled proximity sensor according to a second result detected by using another sensor.

In accordance with another aspect of the present invention, a method of avoiding screen off in an electronic device is provided. The method includes connecting a call service by enabling a proximity sensor, during the call service, analyzing a first picture image captured by using a camera, and disabling the proximity sensor according to the analyzed first picture image.

In accordance with another aspect of the present invention, the method may further include analyzing a second picture image captured by using the camera, and enabling the disabled proximity sensor according to the analyzed second picture image.

In accordance with another aspect of the present invention, a method of avoiding screen off during a call in an electronic device is provided. The method includes connecting a call service by enabling a proximity sensor, acquiring a first Specific Absorption Rate (SAR) during the call service, and if the first SAR is less than a threshold, disabling the proximity sensor.

In accordance with another aspect of the present invention, the method may further include acquiring a second SAR, and if the second SAR is greater than the threshold, enabling the disabled proximity sensor.

In accordance with another aspect of the present invention, a method of avoiding screen off during a call in an electronic device is provided. The method includes connecting a call service by enabling a proximity sensor, recognizing a first voice command during the call service, and upon recognizing the first voice command, disabling the proximity sensor.

In accordance with another aspect of the present invention, the method may further include recognizing a second voice command, and upon recognizing the second voice command, enabling the disabled proximity sensor.

In accordance with another aspect of the present invention, a method in an electronic device is provided. The method includes connecting a call, enabling a proximity sensor upon connection of the call, during a call service corresponding to the call, detecting an event, determining whether the event corresponds to a predefined event for disabling the proximity sensor during the call, and disabling the proximity sensor if the event is determined to correspond to the predefined event.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIGS. 6A to 6D illustrate examples for controlling screen off depending on an up/down-swing operation during an ARS service according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention described hereinafter relate to a method and apparatus for avoiding screen off (e.g., screen deactivation) during an Automatic Response System (ARS) service in an electronic device.

As a non-exhaustive illustration only, an electronic device described herein may refer to mobile devices (e.g., portable electronic devices) such as a cellular phone, a Personal Digital Assistant (PDA), a digital camera, a portable game console, an MP3 player, a Portable/Personal Multimedia Player (PMP), a handheld e-book, a tablet Personal Computer (PC), a Global Positioning System (GPS) navigation, and the like capable of wireless communication or network communication consistent with that disclosed herein. In addition, the electronic device may be any portable electronic device including a device which combines two or more functions among such devices.

According to exemplary embodiments of the present invention, an electronic device configured with a soft keypad input has a function of disabling a proximity sensor at the same time of touching a keypad button and a function of enabling the disabled proximity sensor when an "up-swing" operation is performed to place the electronic device close to an ear of a user in order to listen an ARS synthesized sound of a next step.

Figure 1:
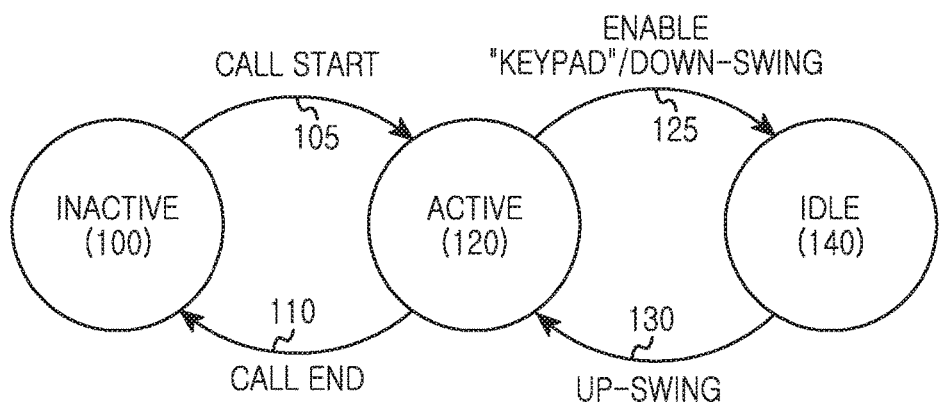
FIG. 1 illustrates a state transition diagram for indicating an active/inactive state of a proximity sensor according to an exemplary embodiment of the present invention.

FIG. 1 illustrates a state transition diagram for indicating an active/inactive state of a proximity sensor according to an exemplary embodiment of the present invention.

Referring to FIG. 1, the state diagram includes an inactive state 100, an active state 120, and an idle state 140. The inactive state 100 corresponds to an initial state of the electronic device (e.g., before a call is made). The active state 100 implies a state in which the call is busy. The idle state 140 corresponds to a state in which the proximity sensor is disabled and a keypad is enabled during the call. In other words, the idle state 140 corresponds to a state in which a user intends to make an input via the keypad during the call.

In the state transition diagram, when a call start event 105 occurs when the electronic device is in the inactive state 100, the state transitions to the active state 120. As a result, the proximity sensor may be enabled. Further, when a call end event 110 occurs in the active state 120, the state transitions to the inactive state 100, and in this case, the proximity sensor is disabled.

If a down-swing operation event 125 occurs when the electronic device is in the active state 120, the state transitions to the idle state 140. In the idle state 140, the proximity sensor is disabled and a soft keypad is enabled. Herein, the soft keypad is enabled when a keypad button is pressed by the user in an early step (e.g., when a first query is responded to during an ARS service). Thereafter, from a second query during the ARS service, the soft keypad is automatically enabled even if the user does not press the keypad button. The down-swing operation corresponds to an operation in which the user moves the electronic device away from the user's ear to check (e.g., view) a display. The down-swing operation may further include a step when the user attempts to input a numeric character of the keypad. Because the proximity sensor is disabled in the idle state 140, the screen off (e.g., screen deactivation) function is not performed even if an object approaches during a call. Accordingly, screen off does not occur when the user inputs a numeric character via the soft keypad during the ARS service.

If an up-swing operation event 130 occurs when the electronic device is in the idle state 140, the state transitions to the active state 120. In the active state 120, the proximity sensor is enabled and the soft keypad is disabled. The up-swing operation corresponds to an operation in which the user checks (e.g., views) the display, inputs a numeric character of the keypad, and thereafter places the electronic device close to the ear. Because the proximity sensor is enabled in the active state 120, the screen off function is performed when an object approaches during the call. Accordingly, screen off occurs when the user places the electronic device close to the ear to listen voice information during the ARS service.

Figure 2A:
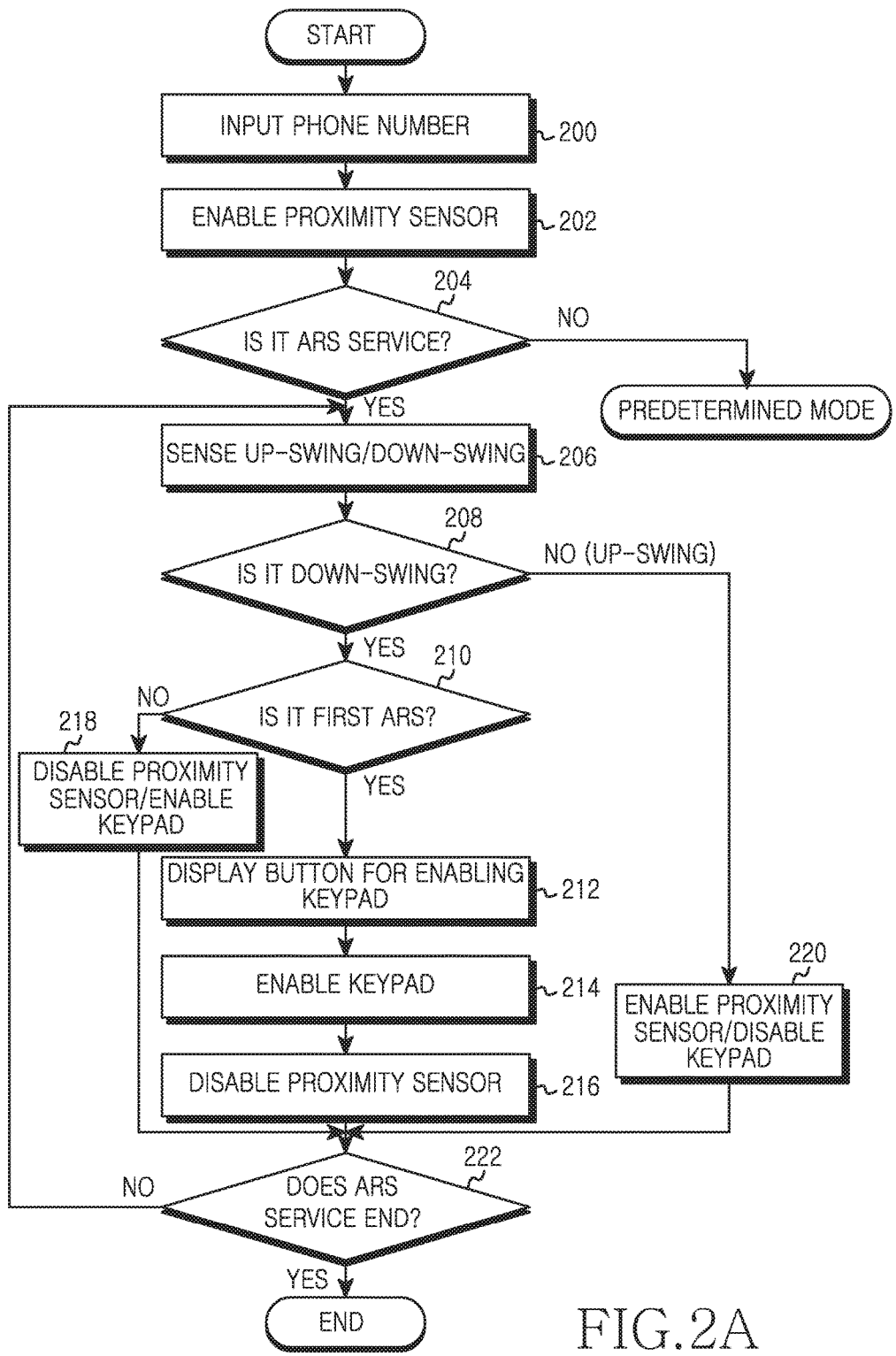
FIG. 2A is a flowchart illustrating a process for avoiding screen off (e.g., screen deactivation) during an Automatic Response System (ARS) service in an electronic device according to a first exemplary embodiment of the present invention.

FIG. 2A is a flowchart illustrating a process for avoiding screen off (e.g., screen deactivation) during an ARS service in an electronic device according to a first exemplary embodiment of the present invention.

Referring to FIG. 2A, the electronic device receives a phone number from a user in step 200.

In step 202, the electronic device enables a proximity sensor. The proximity sensor is used to prevent a loss of electronic current of a display unit and an erroneous operation during a call. For example, if the user places the electronic device close to an ear of the user, a screen is turned off. Conversely, if the user moves the electronic device away from the ear of the user, the screen is turned on.

In step 204, the electronic device determines whether an ARS service is being performed.

If the electronic device determines that the ARS service is being performed in step 204, then the electronic device proceeds to step 206 in which the electronic device senses (e.g., detects) an up-swing/down-swing operation. In contrast, if the electronic device determines that the ARS service is not being performed in step 204, then the electronic device proceeds to perform a predetermined mode. For example, the predetermined mode may be a mode in which the proximity sensor is always enabled during the call and thus when the user places the electronic device close to the ear, the screen is turned off, whereas when the user moves the electronic device away from the ear, the screen is turned on.

According to exemplary embodiments of the present invention, in step 204, the electronic device may determine whether the ARS service is being performed on the basis of the phone number, or according to an implementation, can be determined by the electronic device upon receiving information indicating that the ARS service is available or being performed from the ARS service after a call connection.

According to exemplary embodiments of the present invention, the electronic device may not determine whether the ARS service is being performed in step 204. In this case, the up-swing/down-swing operation is sensed irrespective of the ARS service.

The down-swing operation may correspond to an operation in which the user moves the electronic device away from the user's ear to check (e.g., view) a display and thereafter attempts to input a numeric character of a keypad. The up-swing operation may correspond to an operation in which the user checks (e.g., views) the display, thereafter inputs a numeric character of the keypad, and thereafter places the electronic device close to the user's ear. The up-swing/down-swing operation can be sensed (e.g., detected) by using a motion recognition sensor. The motion recognition sensor is a complex sensor in which various sensors (e.g., a geo-magnetic sensor, an accelerometer sensor, and the like) and functions of an altimeter, a gyro, and the like, are integrated in one chip.

Although the up-swing/down-swing operation is sensed (e.g., detected) by the motion recognition sensor, exemplary embodiments of the present invention are not limited thereto. For example, the down-swing is an operation in which the active state of (e.g., active state 120 of FIG. 1) transitions to the idle state. Because the proximity sensor is enabled in the active state, when the proximity sensor senses (e.g., detects) that the user moves the electronic device away from the ear of the user, the electronic device may recognize such an event as the down-swing operation.

In step 208, the electronic device determines whether the down-swing operation is sensed (e.g., detected). If the electronic device determines that the down-swing operation is sensed (e.g., detected) in step 208, then the electronic device proceeds to step 210 in which the electronic device determines whether a query is a first ARS query.

Figure 8:
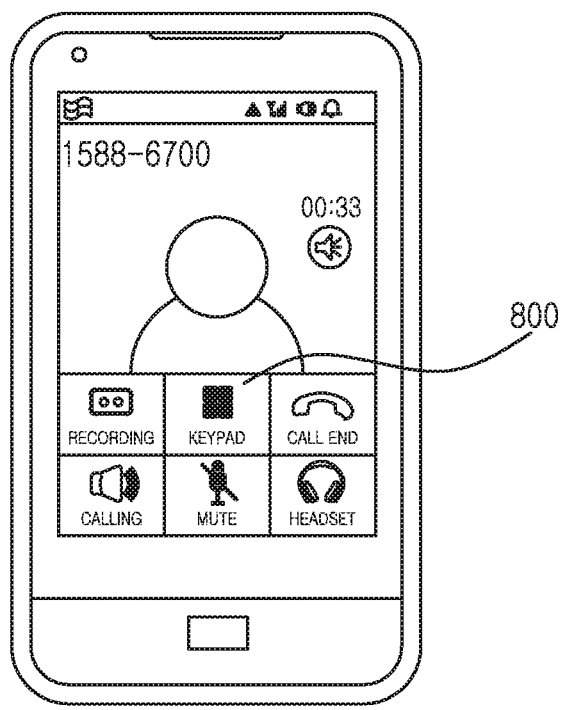
FIG. 8 illustrates a screen for displaying a button for enabling a keypad according an exemplary embodiment of the present invention.

If the electronic device determines that the query corresponds to the first ARS query in step 210, then the electronic device proceeds to step 212 in which the electronic device displays a button for enabling the keypad as illustrated in FIG. 8 to be described below.

In step 214, the electronic device determines whether the button for enabling the keypad is selected by the user. If the button for enabling the keypad is selected by the user, then the keypad is enabled as illustrated in FIG. 6D.

In step 216, the electronic device disables the proximity sensor, and enables the soft keypad.

In contrast, if the electronic device determines that the query does not correspond to the first ARQ query in step 210, then the electronic device proceeds to step 218 in which the proximity sensor is disabled, and simultaneously, the keypad is enabled. Thereafter, the electronic device proceeds to step 222.

In this case, because the proximity is disabled, screen off does not occur when the user inputs a numeric character by using the soft keypad during the ARS service.

If the electronic device determines that the up-swing operation is sensed (e.g., detected) in step 208, then the electronic device proceeds to step 220 in which the electronic device enables the proximity sensor and disables the soft keypad. In this case, because the proximity sensor is enabled, screen off occurs when the user places the electronic device close to the ear to listen voice information during the ARS service. Thereafter, the electronic device proceeds to step 222.

In step 222, the electronic device determines whether the ARS service ends.

If the electronic device determines that the ARS service does not end in step 222, then the procedure returns to step 206. Otherwise, if the electronic device determines that the ARS service ends in step 222, then the procedure of FIG. 2A ends.

Figure 7:
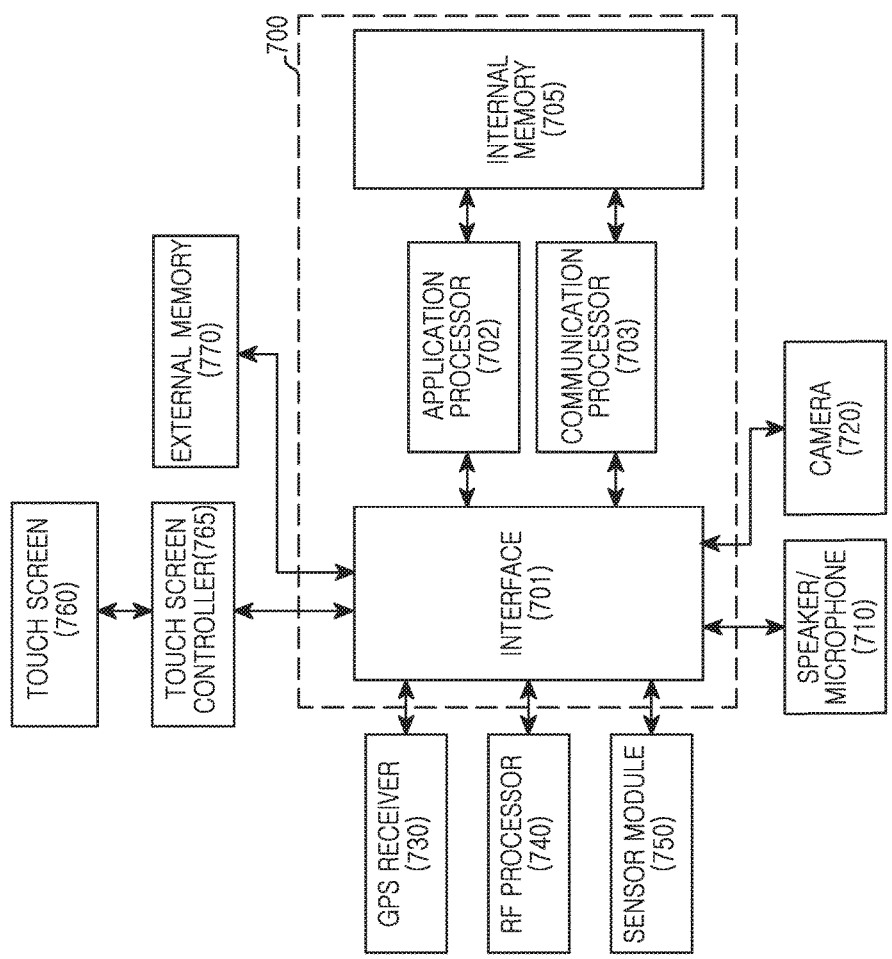
FIG. 7 illustrates an electronic device according to an exemplary embodiment of the present invention.

The instruction set for each step of FIG. 2A can be stored in one or more modules of the memories 705 and 707 illustrated in FIG. 7. As an example, the module stored in the memory can be executed by one or more processors.

Figure 2B:
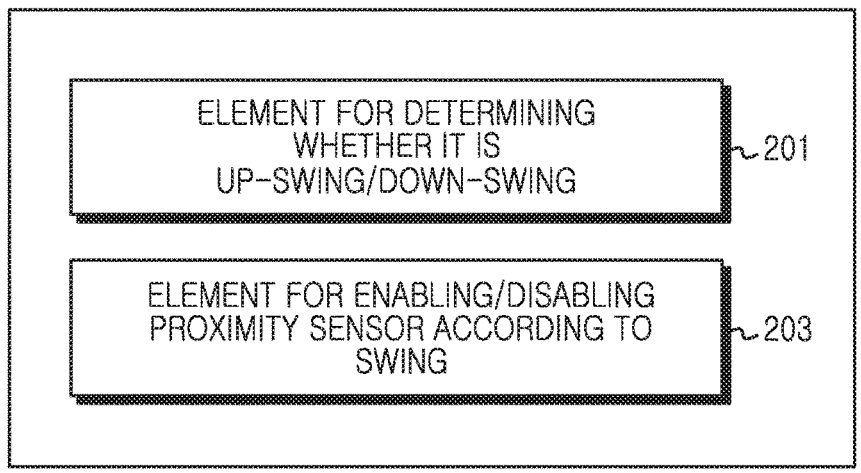
FIG. 2B is a block diagram illustrating an electronic device such as, for example, the electronic device described in association with the flowchart of FIG. 2A, according to a first exemplary embodiment of the present invention.

FIG. 2B is a block diagram illustrating an electronic device such as, for example, the electronic device described in association with the flowchart of FIG. 2A, according to a first exemplary embodiment of the present invention.

Referring to FIG. 2B, the electronic device includes an element 201 for determining an up-swing/down-swing operation (e.g., for determining whether an event corresponds to an up-swing operation or a down-swing operation) and an element 203 for enabling or disabling a proximity sensor according to the up-swing operation or the down-swing operation.

Figure 3A:
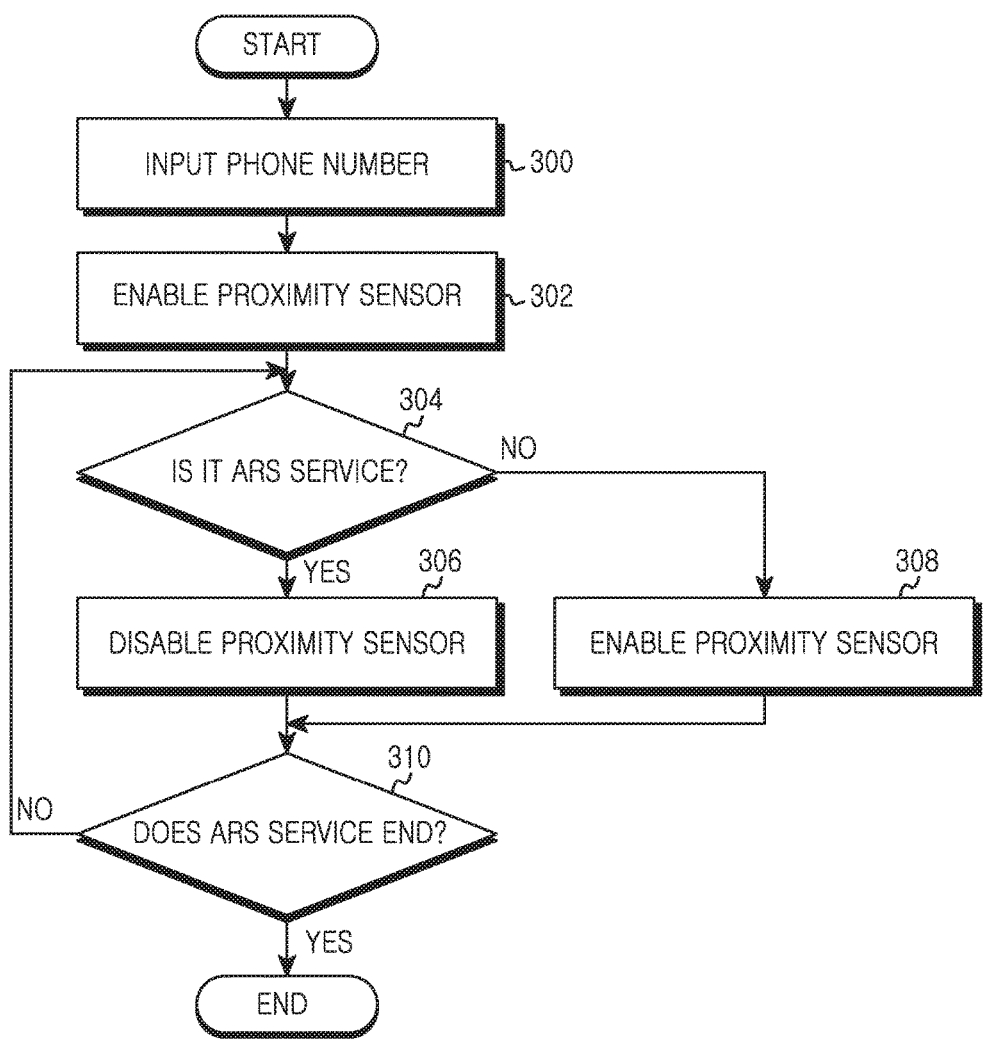
FIG. 3A is a flowchart illustrating a process for avoiding screen off during an ARS service in an electronic device according to a second exemplary embodiment of the present invention.

FIG. 3A is a flowchart illustrating a process for avoiding screen off during an ARS service in an electronic device according to a second exemplary embodiment of the present invention.

Referring to FIG. 3A, in step 300, the electronic device receives a phone number from a user.

In step 302, the electronic device enables a proximity sensor. The proximity sensor is used to prevent a loss of electronic current of a display unit and an erroneous operation during a call. For example, if the user places the electronic device close to an ear of the user, a screen is turned off. Conversely, if the user moves the electronic device away from the ear of the user, the screen is turned on.

In step 304, the electronic device determines whether an ARS service is being performed or is otherwise available on the basis of the input phone number. According to exemplary embodiments of the present invention, the electronic device may determine whether the ARS service is being performed or is otherwise available upon receiving information indicating that the ARS service is available or being performed from an ARS system after a call connection.

If the electronic device determines that the ARS service is being performed or is otherwise available in step 304, then the electronic device proceeds to step 306 in which the electronic device disables the proximity sensor and enables the soft keypad. Because the proximity is disabled, screen off does not occur when the user inputs a numeric character by using the soft keypad during the ARS service. Thereafter, the electronic device proceeds to step 310.

In contrast, if the electronic device determines that the ARS service is not being performed or is not available in step 304, then the electronic device proceeds to step 308 in which the electronic device enables the proximity sensor and disables the soft keypad. Because the proximity sensor is enabled, screen off occurs when the user places the electronic device close to the ear to listen to voice information during the ARS service. Thereafter, the electronic device proceeds to step 310.

In step 310, the electronic device determines whether the ARS service ends.

If the electronic device determines the ARS service does not end in step 312, then the procedure returns to step 304. Otherwise, if the electronic device determines that the ARS service ends, then the procedure of FIG. 3A ends.

The instruction set for each step of FIG. 3A can be stored in one or more modules of the memories 705 and 707 illustrated in FIG. 7. As an example, the module stored in the memory can be executed by one or more processors.

Figure 3B:
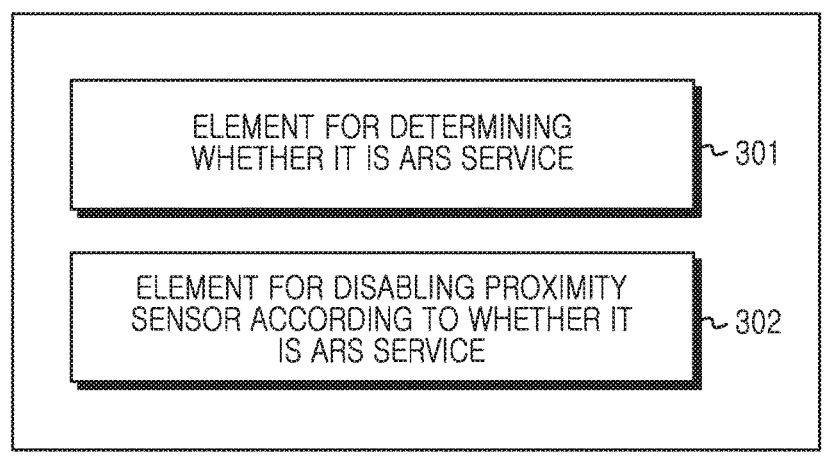
FIG. 3B is a block diagram illustrating an electronic device such as, for example, the electronic device described in association with the flowchart of FIG. 3A, according to a second exemplary embodiment of the present invention.

FIG. 3B is a block diagram illustrating an electronic device such as, for example, the electronic device described in association with the flowchart of FIG. 3A, according to a second exemplary embodiment of the present invention.

Referring to FIG. 3B, the electronic device includes an element 301 for determining whether an ARS service is being performed or is otherwise available, and an element 302 for enabling or disabling a proximity sensor according to whether the ARS service is being performed or is otherwise available.

Figure 4B:
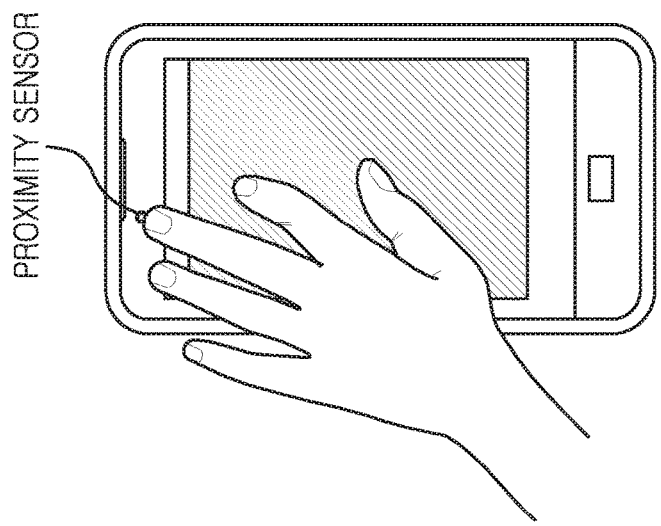
FIGS. 4A and 4B illustrate screens showing screen off caused by a proximity sensor which is always enabled during a call according to an exemplary embodiment of the present invention.
Figure 4A:
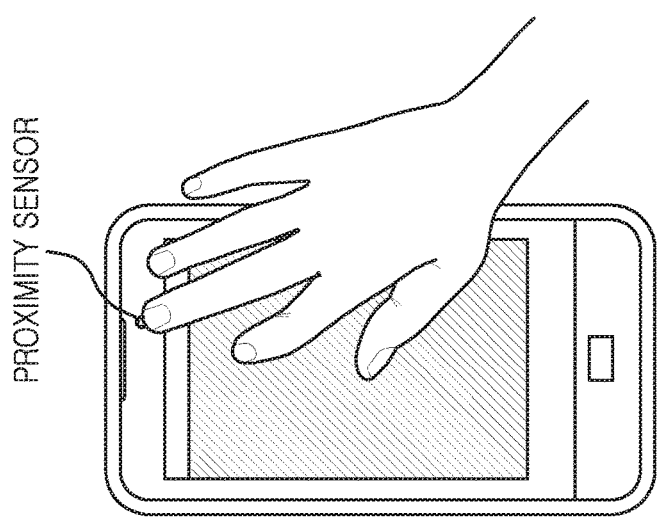

FIGS. 4A and 4B illustrate screens showing screen off caused by a proximity sensor which is always enabled during a call according to an exemplary embodiment of the present invention.

Referring to FIGS. 4A and 4B, a hand used to input an alphanumeric character via a soft keyboard may depend on whether the user is right-handed or left-handed, or may depend on the way by which the user holds the electronic device. As illustrated in FIG. 4A, when a right-handed user inputs an alphanumeric character via a soft keypad during a call, a hand approaches the proximity sensor from an upper-right portion of the screen (and proximity sensor) and thus screen off occurs. As illustrated in FIG. 4B, when a left-handed user inputs an alphanumeric character via a soft keypad during a call, a hand approaches to the proximity sensor in an upper-left portion and thus screen off occurs (FIG. 4B).

Figure 5A:
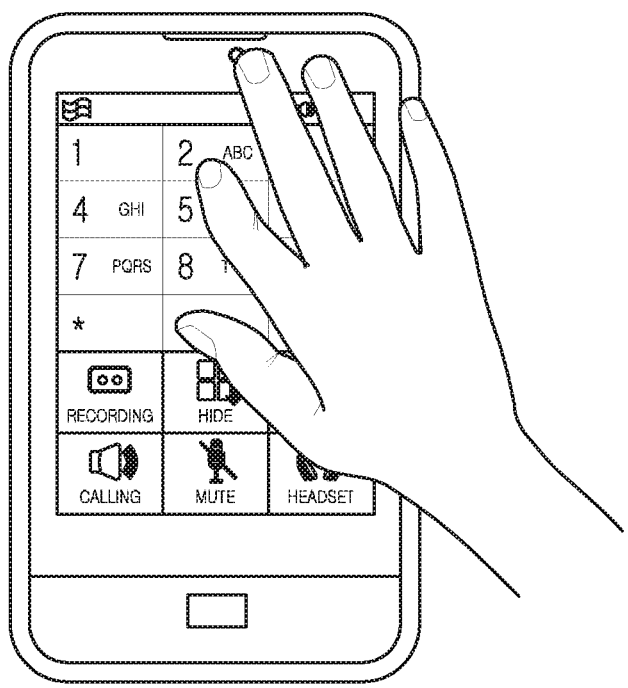
FIGS. 5A and 5B illustrate screens showing screen off caused by a proximity sensor which is enabled or disabled depending on an up/down swing operation during a call according to an exemplary embodiment of the present invention.
Figure 5B:
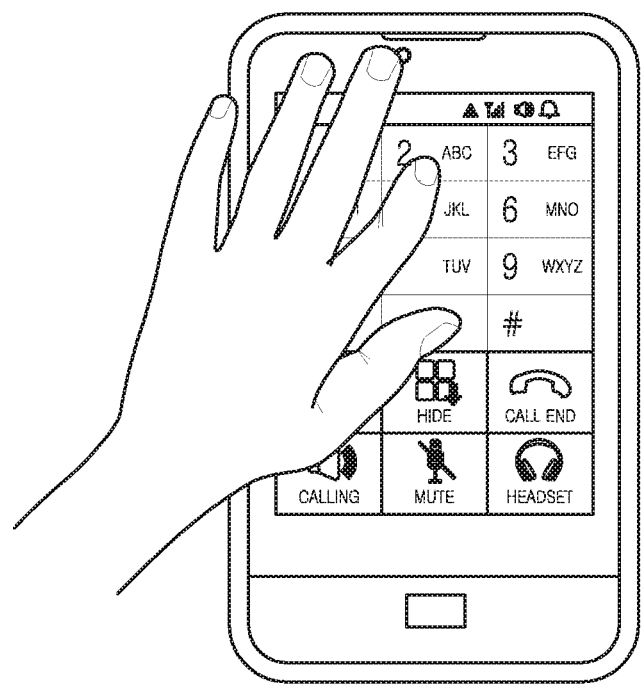

FIGS. 5A and 5B illustrate screens showing screen off caused by a proximity sensor which is enabled or disabled depending on an up/down swing operation during a call according to an exemplary embodiment of the present invention.

Referring to FIGS. 5A and 5B, when an alphanumeric character is input via a soft keypad during an ARS service, the electronic device may disable a proximity sensor according to whether the user is right-handed or left-handed, or according to the way by which the user holds the electronic device. As illustrated in FIG. 5A, when a right-handed user inputs an alphanumeric character via a soft keypad during an ARS service (e.g., a down-swing operation), the proximity sensor in an upper-right portion is disabled and thus screen off does not occur even if a hand approaches. As illustrated in FIG. 5B, when a left-handed user inputs an alphanumeric character via a soft keypad during an ARS service (e.g., a down-swing operation), the proximity sensor in an upper-left portion is disabled and thus screen off does not occur even if a hand approaches.

FIGS. 6A to 6D illustrate examples for controlling screen off depending on an up/down-swing operation during an ARS service according to an exemplary embodiment of the present invention.

Referring to FIGS. 6A to 6D, the electronic device may variably control whether a proximity sensor is enabled or disabled according to the function or use of the electronic device. As illustrated in FIGS. 6A and 6C, if a user places an electronic device such as a portable terminal close to an ear of the user to make a call (e.g., if an up-swing operation is performed), a proximity sensor is enabled and thus screen off occurs to avoid an erroneous operation and electric current consumption in a display. For example, FIG. 6C illustrates a state in which a screen of the electronic device is turned off when the user places the electronic device close to the ear of the user.

As illustrated in FIGS. 6B and 6D, if the user does not place the electronic device such as the portable terminal close to the ear (e.g., if a down-swing operation is performed in which the user intends to make an input via a soft keypad of the display), the screen is turned on and the proximity sensor is disabled. Therefore, when the user inputs a numeric character or extra characters (e.g., *, #, and the like) via the soft keypad according to the ARS service, the screen off does not occur, and thus the user can use the electronic device without any inconvenience as if the user performs the ARS service via a typical hardware keypad. For example, FIG. 6D illustrates a soft keypad displayed on a screen 610 of an electronic device 600 irrespective of an operation of a proximity sensor when a down-swing operation is performed to make an input via a soft keypad of a display.

Although an example of enabling/disabling the proximity sensor according to the down-swing operation or the up-swing operation is described above with reference to FIG. 1 to FIG. 6D, exemplary embodiments of the present invention are not limited thereto. According to exemplary embodiments of the present invention, the proximity sensor can be disabled when a specific key (e.g., a soft keypad 800 of FIG. 8) is pressed, and the proximity sensor can be disabled when a corresponding numeric character is pressed in response to an ARS service.

According to exemplary embodiments of the present invention, the proximity sensor can be enabled/disabled by combining sensing of the up/down-swing operation and selecting of a specific key. For example, the proximity sensor can be disabled when a specific key (e.g., a soft keypad 800 illustrated in FIG. 8) is pressed, and the proximity sensor can be enabled upon sensing the up-swing operation.

FIG. 7 illustrates an electronic device according to an exemplary embodiment of the present invention.

Referring to FIG. 7, the electronic device includes a controller 700, a speaker/microphone 710, a camera 720, a Global Positioning System (GPS) receiver 730, a Radio Frequency (RF) processor 740, a sensor module 750, a touch screen 760, a touch screen controller 765, and a memory (e.g., an external memory 770).

The controller 700 may include an interface 701, at least one processor (e.g., an application processor 702, a communication processor 703, and the like), and an internal memory 705. The entire part of the controller 700 may be referred to as a processor. The interface 701, the application processor 702, the communication processor 703, and the internal memory 705 may be separate components or may be integrated in one or more integrated circuits.

The application processor 702 and the communication processor 703 perform various functions for the electronic device by executing a variety of software programs. For example, the communication processor 703 processes and controls voice communication and data communication. In addition to such a function, the application processor 702 and the communication processor 703 may also execute a specific software module (e.g., an instruction set) stored in the external memory 770 or the internal memory 705 and thus perform various specific functions corresponding to the module. For example, the application processor 702 and the communication processor 703 perform a method according to exemplary embodiments of the present invention by interworking with software modules stored in the external memory 770 or stored in the internal memory 705.

According to the first exemplary embodiment of the present invention, the application processor 702 receives a phone number from a user and enables a proximity sensor. The proximity sensor is used to prevent a loss of electronic current of a display unit and an erroneous operation during a call. For example, if the user places the electronic device close to an ear of the user, a screen is turned off, and if the user moves the electronic device away from the ear of the user, the screen is turned on. Further, the application processor 702 determines whether the ARS service is being performed or is otherwise available, and if the ARS service is being performed or is otherwise available, the electronic device (e.g., the application processor 702) senses an up-swing/down-swing operation. The electronic device may determine whether the ARS service is being performed or is otherwise available on the basis of the phone number. According to exemplary embodiments of the present invention, the electronic device can determine whether the ARS service is being performed or is otherwise available upon receiving information indicating that the ARS service is being performed or is otherwise available from the ARS service after a call connection. According to exemplary embodiments of the present invention, the electronic device may not determine whether the ARS service is being performed or is otherwise available, and in this case, the up-swing/down-swing operation is sensed irrespective of the ARS service.

Upon sensing the down-swing operation, the application processor 702 disables the proximity sensor and enables the soft keypad. In this case, because the proximity is disabled, screen off does not occur when the user inputs a numeric character by using the soft keypad during the ARS service. In contrast, upon sensing the up-swing operation, the application processor 702 enables the proximity sensor and disables the soft keypad. In this case, because the proximity sensor is enabled, screen off occurs when the user places the electronic device close to the ear to listen voice information during the ARS service.

According to the second exemplary embodiment of the present invention, the application processor 702 receives a phone number from a user, enables a proximity sensor, and determines whether an ARS service is being performed or is otherwise available on the basis of the input phone number. According to exemplary embodiments of the present invention, the electronic device may whether the ARS service is being performed or is otherwise available upon receiving information indicating that the ARS service is being performed or is otherwise available from an ARS system after a call connection.

If the electronic determines that the ARS service is being performed or is otherwise available, the application processor 702 disables the proximity sensor and enables the soft keypad. Otherwise, if the electronic device determines that the ARS service is not being performed or is not otherwise available, the application processor 702 enables the proximity sensor and disables the soft keypad.

The interface 701 is connected to the touch screen controller 765 of the electronic device and the external memory 770.

The sensor module 750 coupled to the interface 701 can enable various functions. For example, a motion sensor and an optical sensor can be coupled to the interface 701 to respectively enable motion sensing and external light-beam sensing. In addition, other sensors such as a location measurement system, a temperature sensor, a biometric sensor, and/or the like can be coupled to the interface 701 to perform related functions.

The sensor module 750 senses (e.g., detects) an up/down-swing operation of the user, and senses (e.g., detects) whether an object approaches the electronic device by using a proximity sensor. The proximity sensor is enabled during a call. In particular, during the ARS service, the proximity sensor is disabled upon sensing (e.g., detecting) the down-swing operation, and the proximity sensor is enabled upon sensing (e.g., detecting) the up-swing operation.

The camera 720 is coupled to the sensor module 750 via the interface 701, and can perform a camera function such as photographing, video clip recording, and the like.

The RF processor 740 performs a communication function. For example, an RF signal is converted to a baseband signal under the control of the communication processor 703, and is then provided to the communication processor 703, or a baseband signal from the communication processor 703 is transmitted by being converted into an RF signal. The communication processor 703 processes the baseband signal by using various communication schemes. For example, although not limited thereto, the communication scheme may include a Global System for Mobile Communication (GSM) communication scheme, an Enhanced Data GSM Environment (EDGE) communication scheme, a Code Division Multiple Access (CDMA) communication scheme, a Wideband-Code Division Multiple Access (W-CDMA) communication scheme, a Long Term Evolution (LTE) communication scheme, an Orthogonal Frequency Division Multiple Access (OFDMA) communication scheme, a Wi-Fi communication scheme, a WiMax communication scheme, a Bluetooth communication scheme, and/or the like.

The speaker/microphone 710 may input and output an audio stream such as audio streams for voice recognition, voice reproduction, digital recording, telephony functions, and the like. For example, the speaker/microphone 710 converts an audio signal into an electronic signal or converts the electronic signal into the audio signal. Although not shown, an attachable and detachable ear phone, headphone, or headset can be connected to the electronic device via an external port.

The touch screen controller 765 can be coupled to the touch screen 760. Although not limited thereto, the touch screen 760 and the touch screen controller 765 may use capacitance, resistance, infrared, surface sound wave techniques, and the like for determining one or more contact points. The touch screen 760 and the touch screen controller 765 may also use multi-touch sense techniques including other proximity sensor arrays or other elements to sense a contact, a movement, or stopping thereof.

The touch screen 760 provides an input/output interface between the electronic device and the user. For example, the touch screen 760 delivers a touch input of the user to the electronic device. In addition, the touch screen 760 is a medium which shows an output from the electronic device to the user. For example, the touch screen shows a visual output to the user. Such a visual output is represented in the form of a text, a graphic, a video, and a combination thereof.

A variety of displays can be used as the touch screen 760. For example, the touch screen 760 may include a Liquid Crystal Display (LCD), a Light Emitting Diode (LED), a Light Emitting Polymer Display (LPD), an Organic Light Emitting Diode (OLED), an Active Matrix Organic Light Emitting Diode (AMOLED), a Flexible LED (FLED), and/or the like.

The GPS receiver 730 converts a signal received from a satellite into information of a location, a speed, a time, and the like. For example, a distance between the satellite and the GPS receiver is calculated by multiplying a speed of light by a signal arrival time, and a location of the electronic device is measured according to a principle of a well-known triangulation by obtaining a distance and a correct location of three satellites.

The external memory 770 or the internal memory 705 may include a fast Random Access Memory (RAM) such as one or more magnetic disc storage devices and/or a non-volatile memory, one or more optical storage devices, a flash memory (e.g., NAND, NOR), and/or the like.

The external memory 770 and/or the internal memory 705 stores a software component. The software component includes an operating system software module, a communication software module, a graphic software module, a user interface software module, a Moving Picture Experts Group (MPEG) module, a camera software module, one or more application software modules, and the like. In addition, because a module (e.g., a software component), can be expressed as a group of instructions, the module can also be expressed as an instruction set. The module is also expressed as a program.

The operating system software includes various software components for controlling a general system operation. The control of the general system operation includes memory management and control, storage hardware (device) control and management, power control and management, and the like. In addition, the operating system software performs a function for facilitating communication between various hardware elements (devices) and software elements (modules).

The communication software module can enable communication with other electronic devices such as a computer, a server, and/or a portable terminal via the RF processor 740. Further, the communication software module may include a protocol structure conforming to a corresponding communication scheme.

The graphic software module includes various software components for providing and displaying graphics on the touch screen unit 760. The term "graphics" may correspond to a text, a web page, an icon, a digital image, a video, an animation, and the like.

The user interface software module includes various software components related to the user interface. The user interface software module includes the content related to how a state of the user interface changes and in which condition the state of the user interface changes.

The camera software module includes a camera-related software component which enables camera-related processes and functions. The application module may include a browser function, an e-mail function, an instant message function, word processing function, a keyboard emulation function, an address book function, a touch list, a widget, Digital Rights Management (DRM), a voice recognition function, a voice reproduction function, a location determining function, a location-based service, and the like. The memories (e.g., external memory 770 and internal memory 705) may further include additional modules (instructions) in addition to the aforementioned modules. Alternatively, some of the modules (instructions) may not be used.

According to exemplary embodiments of the present invention, the application module includes an instruction set corresponding to a method of implementing the present invention. According to the first exemplary embodiment of the present invention, the instruction set includes an instruction for receiving a phone number from a user, for enabling a proximity sensor, for determining whether an ARS service is being performed or is otherwise available, for sensing an up-swing/down-swing operation if the ARS service is being performed, for, upon sensing the down-swing operation, disabling the proximity sensor and enabling the soft keypad, and for, upon sensing the up-swing operation, enabling the proximity sensor and disabling the soft keypad.

According to the second exemplary embodiment of the present invention, the instruction set includes an instruction for receiving a phone number from a user, for enabling a proximity sensor, for determining whether an ARS service is being performed or is otherwise available on the basis of the input phone number, for, if the ARS service is being performed, disabling the proximity sensor and enabling the soft keypad in case of the ARS service, and for, if the ARS service is not being performed, enabling the proximity sensor and disabling the soft keypad.

In addition, various functions of the electronic device according to exemplary embodiments of the present invention, described above and to be described below, can be performed by using one or more stream processors and/or a hardware component including an Application Specific Integrated Circuit (ASIC) and/or a software component, and/or a combination thereof.

FIG. 8 illustrates a screen for displaying a button 800 for enabling a keypad according an exemplary embodiment of the present invention.

Referring to FIG. 8, when a user uses an ARS service, an operation of a proximity sensor is disabled by a software control of an electronic device at the same time of touching a "keypad button" to make a keypad input. Accordingly, "screen off" caused by the keypad input of the user can be avoided while the user uses the ARS service.

In addition, the keypad is touched to proceed to a next step from a first step of the ARS service. Thereafter, if an "up-swing" operation in which the user places the electronic device close to the ear of the user is performed to listen an ARS query of the next step, the proximity sensor is enabled again, so that a screen off function is performed by a sensing operation of the proximity sensor when the electronic device is located proximate to the ear. In the up-swing operation, if a "down-swing" operation in which the user moves the electronic device away from the ear is performed to input an ARS button, the proximity sensor is disabled again, thereby avoiding the "screen off". Therefore, according to exemplary embodiments of the present invention, because the proximity sensor is temporarily disabled when the user may frequently make a keypad input or listen to an ARS synthesized sound according to a characteristic of the ARS service, an ARS service can be used conveniently without rendering an original purpose of the proximity sensor (e.g., preventing an erroneous operation and electric current consumed by a display during a call) ineffective.

Figure 9:
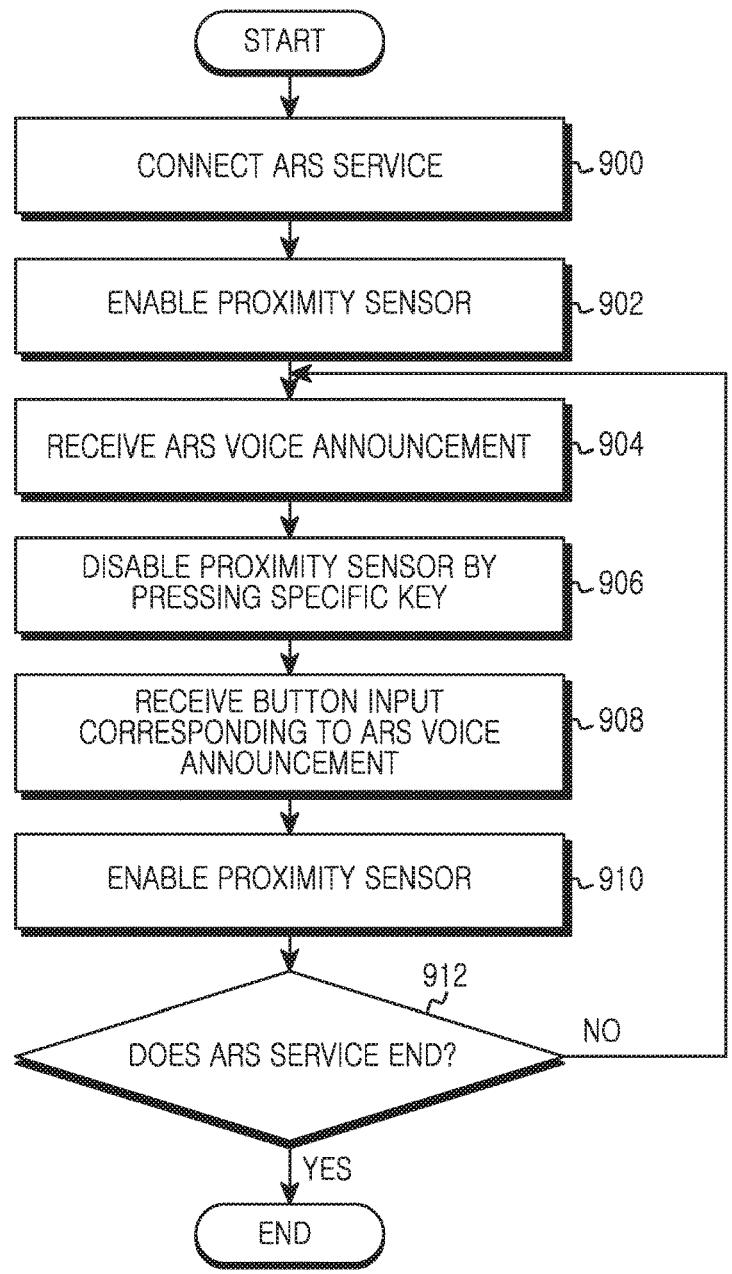
FIG. 9 is a flowchart illustrating a process of avoiding screen off during an ARS service in an electronic device according to a third exemplary embodiment of the present invention.

FIG. 9 is a flowchart illustrating a process of avoiding screen off during an ARS service in an electronic device according to a third exemplary embodiment of the present invention.

Referring to FIG. 9, in step 900, the electronic device receives a phone number from a user, and connects to an ARS service.

In step 902, a proximity sensor is enabled. The proximity sensor is used to prevent a loss of electronic current of a display unit and an erroneous operation during a call. For example, if the user places the electronic device close to an ear of the user, a screen is turned off, and if the user moves the electronic device away from the ear of the user, the screen is turned on.

In step 904, the electronic device receives a voice announcement from an ARS service system. In this case, the user can listen to an ARS voice announcement by placing the electronic device close to the ear of the user.

Thereafter, in step 906, before the user touches one numeric character in the soft keypad according to a voice announcement from the system, the electronic device disables the proximity sensor when the user touches a specific key. Because the proximity sensor is disabled, screen off does not occur when the user inputs the numeric character via the soft keypad. The specific key may correspond to one of a hardware key (e.g., a volume control key, a selection key, a home button, etc.) and a specific soft key (e.g., a key for enabling the soft keypad (such as the soft keypad illustrated in FIG. 8), a soft key for executing an application such as a memo pad) of the electronic device.

In step 908, when the user presses any character (e.g., 0-9 or #, *, and the like) in the soft keypad according to the ARS service voice announcement, the electronic device receives a corresponding pressed soft key. The corresponding pressed soft key is provided to the ARS service system, and proceeding to a next step, the ARS service voice announcement is received.

In step 910, when the user presses any character (e.g., 0-9 or #, *, and the like) in the soft keypad according to the ARS service voice announcement, the electronic device enables the proximity sensor and disables the soft keypad. Because the proximity sensor is enabled, screen off occurs when the user places the electronic device close to the ear to listen voice information during the ARS service.

In step 912, the electronic device determines whether the ARS service ends.

If the electronic device determines that the ARS service does not end in step 912, then the electronic device proceeds to step 904 in which the electronic device receives a next ARS service voice announcement. Otherwise, if the electronic device determines that the ARS service ends in step 912, then the procedure of FIG. 9 ends.

The instruction set for each step of FIG. 9 can be stored in one or more modules of the memories 705 and 707 of FIG. 7. As an example, the module stored in the memory can be executed by one or more processors.

Figure 10:
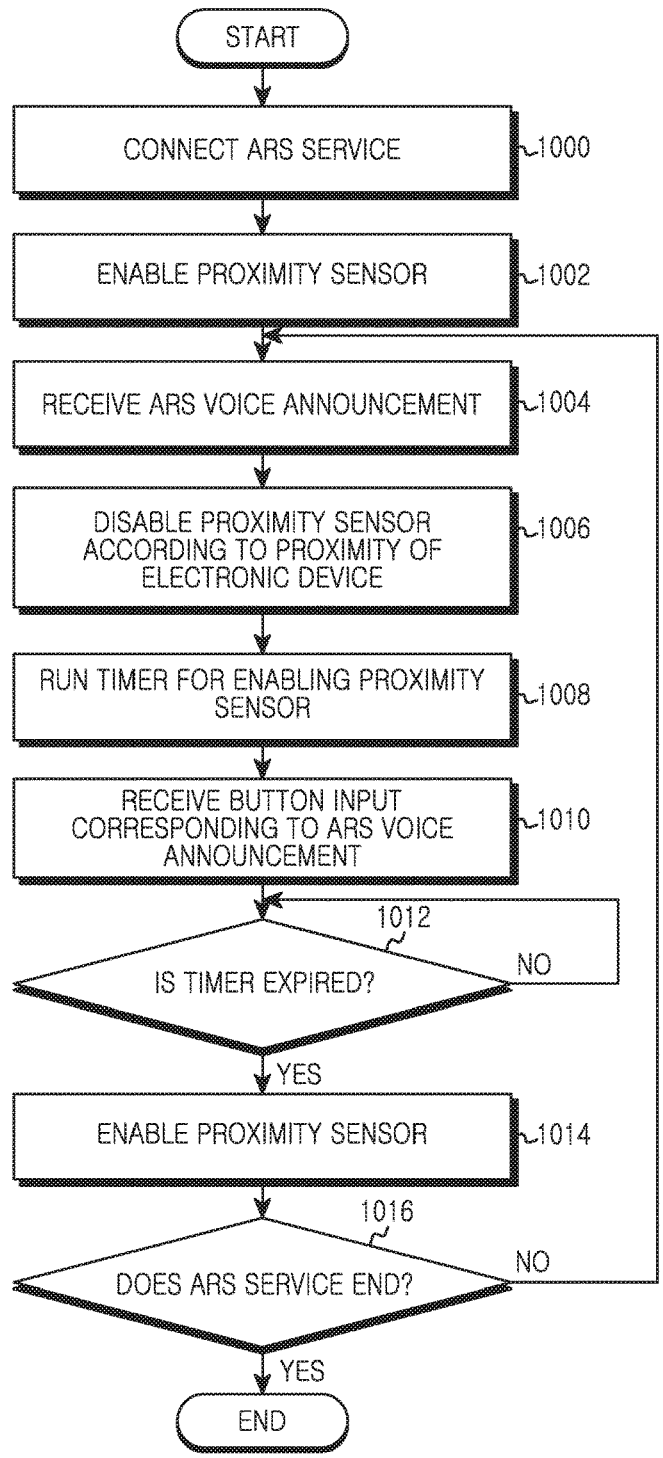
FIG. 10 is a flowchart illustrating a process of avoiding screen off during an ARS service in an electronic device according to a fourth exemplary embodiment of the present invention.

FIG. 10 is a flowchart illustrating a process of avoiding screen off during an ARS service in an electronic device according to a fourth exemplary embodiment of the present invention.

Referring to FIG. 10, in step 1000, the electronic device receives a phone number from a user, and connects to an ARS service.

In step 1002, a proximity sensor is enabled. The proximity sensor is used to prevent a loss of electronic current of a display unit and an erroneous operation during a call. For example, if the user places the electronic device close to an ear of the user, a screen is turned off, and if the user moves the electronic device away from the ear of the user, the screen is turned on.

In step 1004, the electronic device receives a voice announcement from an ARS service system. In this case, the user can listen to an ARS voice announcement by placing the electronic device close to the ear of the user.

Thereafter, in step 1006, before the user touches one numeric character in the soft keypad according to a voice announcement from the system, the electronic device uses the proximity sensor to determine whether the electronic device is proximate to the ear of the user or is moved away from the ear. If the electronic device determines, by using the proximity sensor, that the electronic device is moved away from the ear, disables the proximity sensor. Because the proximity sensor is disabled, screen off does not occur when the user inputs the numeric character via the soft keypad. In other words, when the user moves the electronic device away from the ear of the user, the proximity sensor is disabled.

In step 1008, the electronic device runs a timer for enabling the proximity sensor. A timer running value can be determined by considering a time required when the user inputs a corresponding soft key by listening to an ARS service voice announcement and thereafter places the electronic device close to the ear of the user to listen a next ARS service voice announcement.

In step 1010, when the user presses any character (e.g., 0-9 or #, *, and the like) in the soft keypad according to the ARS service voice announcement, the electronic device receives a corresponding pressed soft key. The corresponding pressed soft key is provided to the ARS service system, and the ARS service voice announcement is received.

In step 1012, the electronic device determines whether the timer has expired. If the electronic device determines that the timer has not expired in step 1012, the electronic device continues to poll until the timer expires.

If the electronic device determines that the timer expired in step 1012, then the electronic device proceeds to step 1014 in which the electronic device enables the proximity sensor and disables the soft keypad. Because the proximity sensor is enabled, screen off occurs when the user places the electronic device close to the ear to listen voice information during the ARS service.

In step 1016, the electronic device determines whether the ARS service has ended.

If the electronic device determines that the ARS service has not ended in step 1016, then the electronic device proceeds to step 1004 in which the electronic device receives a next ARS service voice announcement. Otherwise, if the electronic device determines that the ARS service has ended in step 1016, the procedure of FIG. 10 ends.

The instruction set for each step of FIG. 10 can be stored in one or more modules of the memories 705 and 707 of FIG. 7. As an example, the module stored in the memory can be executed by one or more processors.

Figure 11:
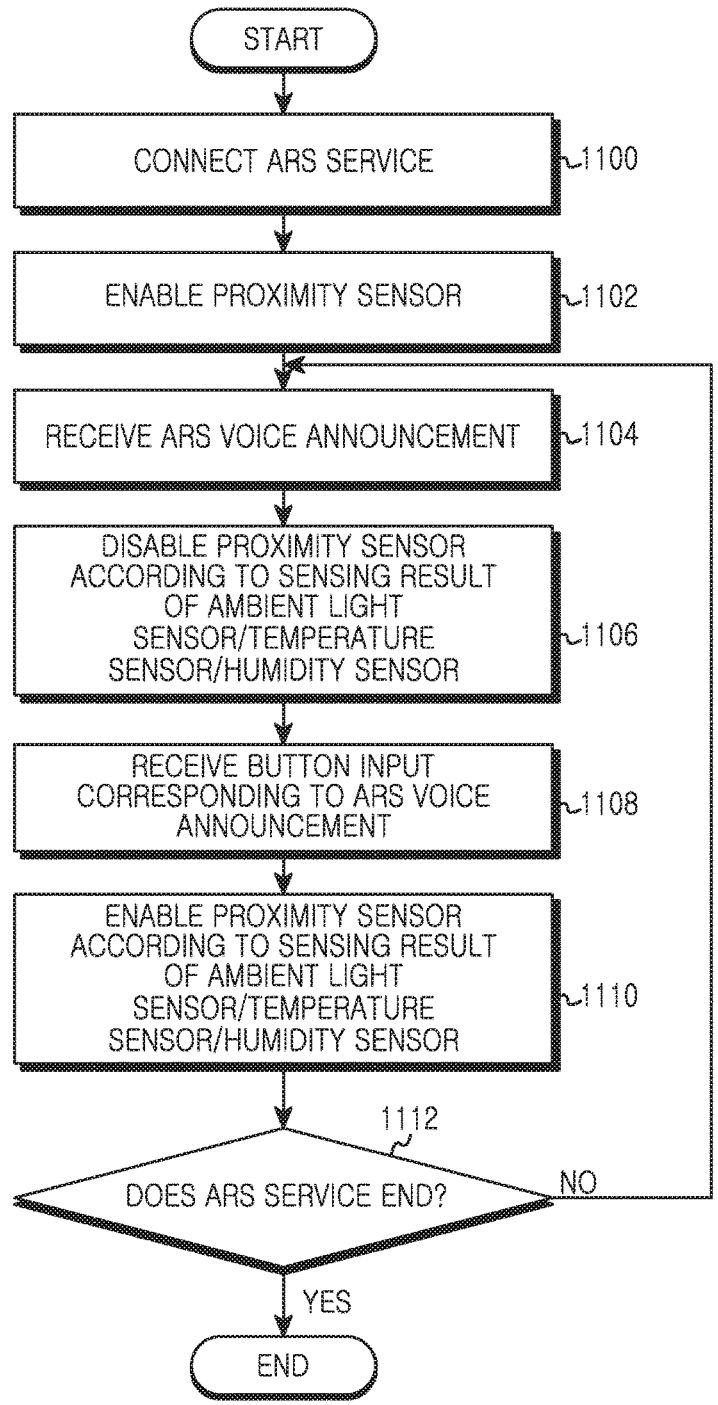
FIG. 11 is a flowchart illustrating a process of avoiding screen off during an ARS service in an electronic device according to a fifth exemplary embodiment of the present invention.

FIG. 11 is a flowchart illustrating a process of avoiding screen off during an ARS service in an electronic device according to a fifth exemplary embodiment of the present invention.

Referring to FIG. 11, in step 1100, the electronic device receives a phone number from a user, and connects to an ARS service.

In step 1102, a proximity sensor is enabled. The proximity sensor is used to prevent a loss of electronic current of a display unit and an erroneous operation during a call. For example, if the user places the electronic device close to an ear of the user, a screen is turned off, and if the user moves the electronic device away from the ear of the user, the screen is turned on.

In step 1104, the electronic device receives a voice announcement from an ARS service system. In this case, the user may listen to an ARS voice announcement by placing the electronic device close to the ear of the user.

Thereafter, in step 1106, before the user touches one numeric character in the soft keypad according to a voice announcement from the system, the electronic device disables the proximity sensor on the basis of a signal sensed by another sensor (e.g., an ambient light sensor, a temperature sensor, a humidity sensor, and the like). Because the proximity sensor is disabled, screen off does not occur when the user inputs the numeric character via the soft keypad. The specific key may correspond to one of a hardware key (e.g., a volume control key, a selection key, and the like) and a specific soft key (e.g., a key for enabling the soft keypad such as the keypad illustrated in FIG. 8, a soft key for executing an application such as a memo pad) of the electronic device. For example, if the ambient light sensor is used to determine a proximity of the electronic device according to a brightness change, the brightness is dark (e.g., relative to a predefined or configurable threshold) when the electronic device is placed close to the ear of the user, and the brightness is not dark when the electronic device is moved away from the ear of the user. If the temperature sensor is used to determine the proximity of the electronic device according to a temperature change, when the electronic device is placed close to the ear of the user, a temperature is high (e.g., relative to a predefined or configurable threshold) due to a body temperature of the user, and when the electronic device is moved away from the ear of the user, the temperature is not high.

In step 1108, when the user presses any character (e.g., 0-9 or #, *, and the like) in the soft keypad according to the ARS service voice announcement, the electronic device receives a corresponding pressed soft key. The corresponding pressed soft key is provided to the ARS service system, and the ARS service voice announcement is received.

In step 1110, the electronic device enables the proximity sensor and disables the soft keypad on the basis of a signal sensed by another sensor (e.g., an ambient sensor, a temperature sensor, and a humidity sensor). In this case, because the proximity sensor is enabled, screen off occurs when the user places the electronic device close to the ear to listen voice information during the ARS service.

In step 1112, the electronic device determines whether the ARS service has ended.

If the electronic device determines the ARS service has not ended in step 1112, then the electronic device proceeds to step 1104 in which the electronic device receives a next ARS service voice announcement. Otherwise, if the electronic device determines that the ARS service has ended in step 1112, then the procedure of FIG. 11 ends.

The instruction set for each step of FIG. 11 can be stored in one or more modules of the memories 705 and 707 of FIG. 7. As an example, the module stored in the memory can be executed by one or more processors.

Figure 12:
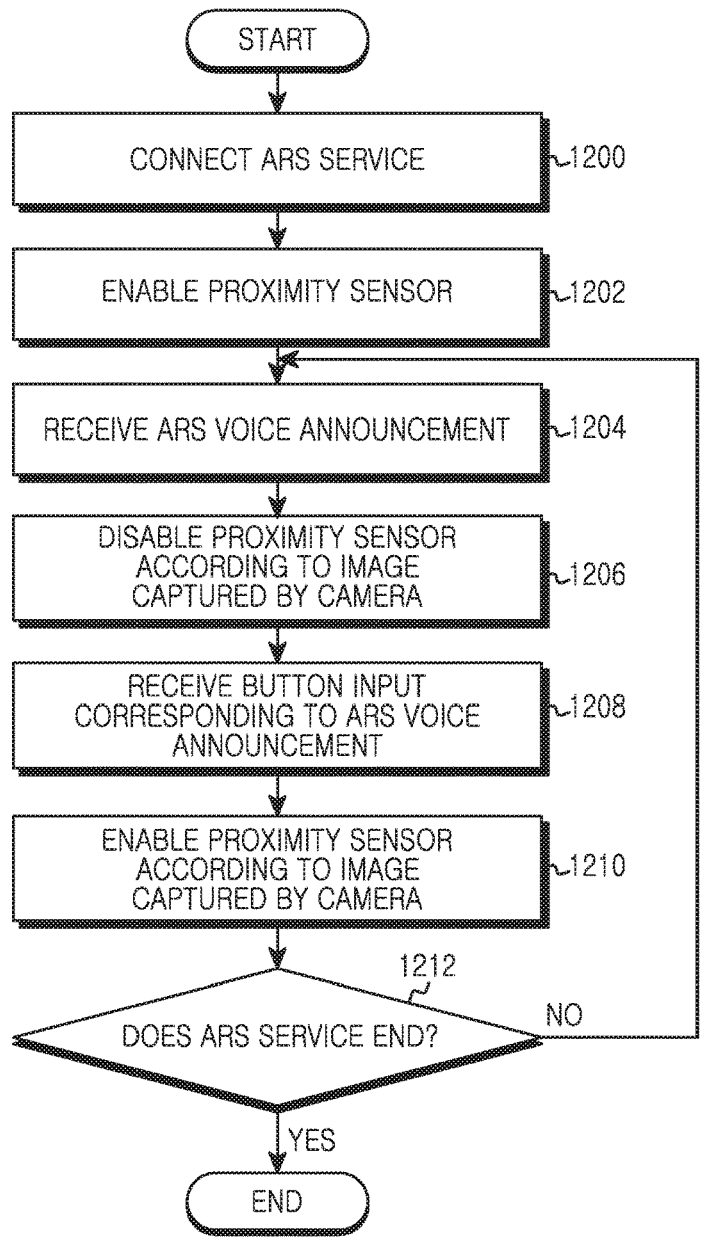
FIG. 12 is a flowchart illustrating a process of avoiding screen off during an ARS service in an electronic device according to a sixth exemplary embodiment of the present invention.

FIG. 12 is a flowchart illustrating a process of avoiding screen off during an ARS service in an electronic device according to a sixth exemplary embodiment of the present invention.

Referring to FIG. 12, in step 1200, the electronic device receives a phone number from a user, and connects an ARS service.

In step 1202, a proximity sensor is enabled. The proximity sensor is used to prevent a loss of electronic current of a display unit and an erroneous operation during a call. For example, if the user places the electronic device close to an ear of the user, a screen is turned off, and if the user moves the electronic device away from the ear of the user, the screen is turned on.

In step 1204, the electronic device receives a voice announcement from an ARS service system. In this case, the user may listen to an ARS voice announcement by placing the electronic device close to the ear of the user.

Thereafter, in step 1206, before the user touches one numeric character in the soft keypad according to a voice announcement from the system, the electronic device disables the proximity sensor on the basis of an image captured by using a camera. Because the proximity sensor is disabled, screen off does not occur when the user inputs the numeric character via the soft keypad. For one example, the electronic device may determine that the electronic device is placed close to the ear of the user when the ear of the user is visible as a result of analyzing the captured image. An algorithm for determining that the electronic device is placed close to the ear of the user when the ear of the user is visible as a result of analyzing the captured image is not provided herein. As another example, the electronic device may determine that the electronic device is placed close to the ear of the user when an eye of the user is visible as a result of analyzing the captured image. An algorithm for determining that the electronic device is placed close to the ear of the user when the eye of the user is visible as a result of analyzing the captured image is not provided herein.

In step 1208, when the user presses any character (e.g., 0-9 or #, *, and the like) in the soft keypad according to the ARS service voice announcement, the electronic device receives a corresponding pressed soft key. The corresponding pressed soft key is provided to the ARS service system, and the ARS service voice announcement is received.

In step 1210, the electronic device enables the proximity sensor and disables the soft keypad on the basis of the image captured by using the camera. Because the proximity sensor is enabled, screen off occurs when the user places the electronic device close to the ear to listen voice information during the ARS service. An algorithm for determining whether the electronic device is placed close to the ear of the user by analyzing the captured image is not provided herein.

In step 1212, the electronic device determines whether the ARS service has ended.

If the electronic device determines that the ARS service has not ended in step 1212, then the electronic device proceeds to step 1204 in which the electronic device receives a next ARS service voice announcement. Otherwise, if the electronic device determines that the ARS service has ended in step 1212, then the procedure of FIG. 12 ends.

The instruction set for each step of FIG. 12 can be stored in one or more modules of the memories 705 and 707 of FIG. 7. As an example, the module stored in the memory can be executed by one or more processors.

Figure 13:
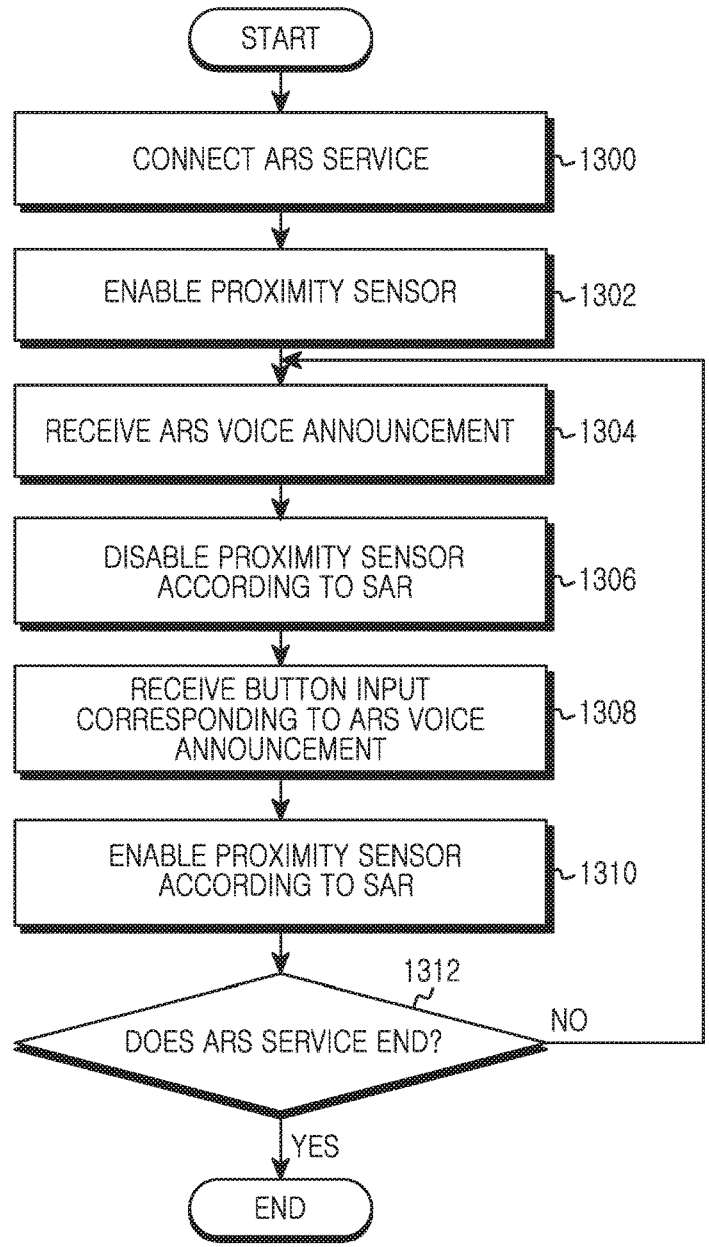
FIG. 13 is a flowchart illustrating a process of avoiding screen off during an ARS service in an electronic device according to a seventh exemplary embodiment of the present invention.

FIG. 13 is a flowchart illustrating a process of avoiding screen off during an ARS service in an electronic device according to a seventh exemplary embodiment of the present invention.

Referring to FIG. 13, in step 1300, the electronic device receives a phone number from a user, and connects an ARS service.

In step 1302, a proximity sensor is enabled. The proximity sensor is used to prevent a loss of electronic current of a display unit and an erroneous operation during a call. For example, if the user places the electronic device close to an ear of the user, a screen is turned off, and if the user moves the electronic device away from the ear of the user, the screen is turned on.

In step 1304, the electronic device receives a voice announcement from an ARS service system. In this case, the user can listen to an ARS voice announcement by placing the electronic device close to the ear of the user.

Thereafter, in step 1306, before the user touches one numeric character in the soft keypad according to a voice announcement from the system, the electronic device disables the proximity sensor on the basis of a Specific Absorption Rate (SAR). Because the proximity sensor is disabled, screen off does not occur when the user inputs the numeric character via the soft keypad. For example, the electronic device may determine that the electronic device is placed close to the ear of the user when the SAR is greater than a threshold.

In step 1308, when the user presses any character (e.g., 0-9 or #, *, and the like) in the soft keypad according to the ARS service voice announcement, the electronic device receives a corresponding pressed soft key. The corresponding pressed soft key is provided to the ARS service system, and the ARS service voice announcement is received.

In step 1310, the electronic device enables the proximity sensor and disables the soft keypad on the basis of the SAR. Because the proximity sensor is enabled, screen off occurs when the user places the electronic device close to the ear to listen voice information during the ARS service. For example, the electronic device may determine that the electronic device is moved away from the ear of the user when the SAR is less than the threshold.

In step 1312, the electronic device determines whether the ARS service has ended.

If the electronic device determines that the ARS service has not ended in step 1312, then the electronic device proceeds to step 1304 in which the electronic device receives a next ARS service voice announcement. Otherwise, if the electronic device determines that the ARS service has ended in step 1312, then the procedure of FIG. 13 ends.

The instruction set for each step of FIG. 13 can be stored in one or more modules of the memories 705 and 707 of FIG. 7. As an example, the module stored in the memory can be executed by one or more processors.

Figure 14:
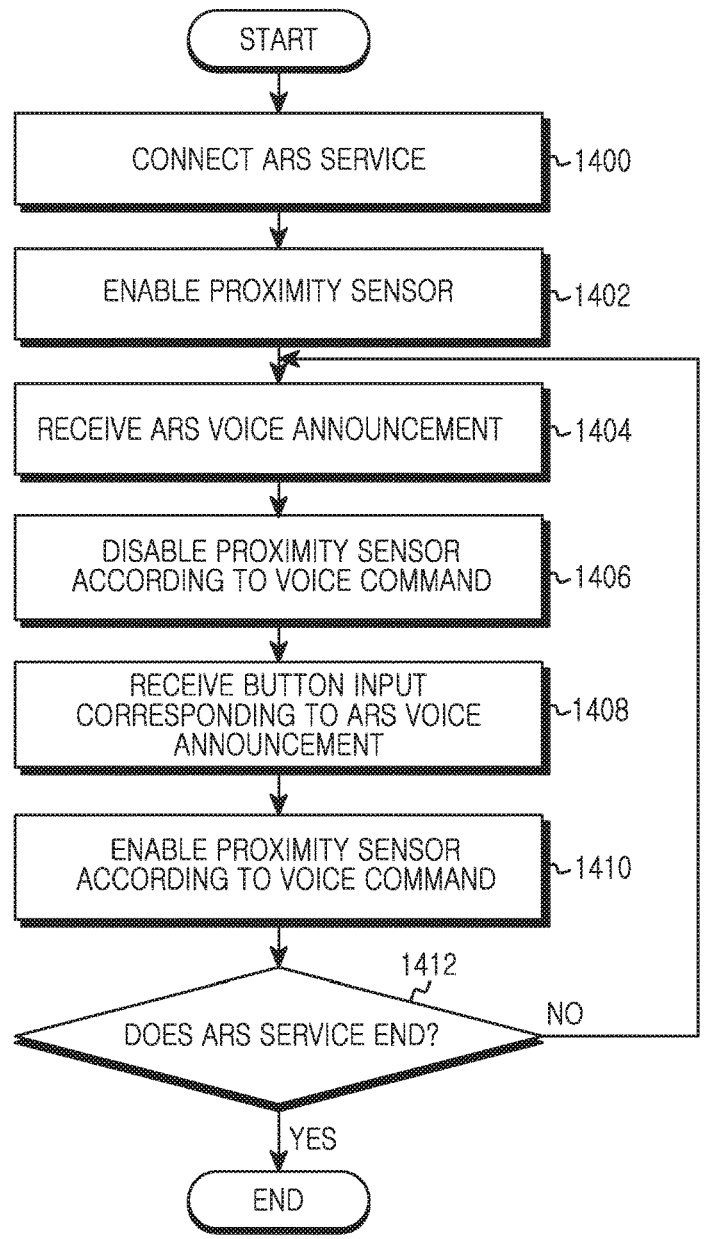
FIG. 14 is a flowchart illustrating a process of avoiding screen off during an ARS service in an electronic device according to an eighth exemplary embodiment of the present invention.

FIG. 14 is a flowchart illustrating a process of avoiding screen off during an ARS service in an electronic device according to an eighth exemplary embodiment of the present invention.

Referring to FIG. 14, in step 1400, the electronic device receives a phone number from a user, and connects an ARS service.

In step 1402, a proximity sensor is enabled. The proximity sensor is used to prevent a loss of electronic current of a display unit and an erroneous operation during a call. For example, if the user places the electronic device close to an ear of the user, a screen is turned off, and if the user moves the electronic device away from the ear of the user, the screen is turned on.

In step 1404, the electronic device receives a voice announcement from an ARS service system. In this case, the user may listen to an ARS voice announcement by placing the electronic device close to the ear of the user.

Thereafter, in step 1406, before the user touches one numeric character in the soft keypad according to a voice announcement from the system, the electronic device disables the proximity sensor on the basis of a voice command. Because the proximity sensor is disabled, screen off does not occur when the user inputs the numeric character via the soft keypad. For example, the proximity sensor is disabled when a voice command of "disabling of the proximity sensor" is input by the user.

In step 1408, when the user presses any character (e.g., 0-9 or #, *, and the like) in the soft keypad according to the ARS service voice announcement, the electronic device receives a corresponding pressed soft key. The corresponding pressed soft key is provided to the ARS service system, and the ARS service voice announcement is received.

In step 1410, the electronic device enables the proximity sensor and disables the soft keypad on the basis of the voice command. Because the proximity sensor is enabled, screen off occurs when the user places the electronic device close to the ear to listen voice information during the ARS service. For example, the proximity sensor is enabled when a voice command of "enabling of the proximity sensor" is input by the user.

In step 1412, the electronic device determines whether the ARS service has ended.

If the electronic device determines that the ARS service has not ended in step 1412, then the electronic device proceeds to step 1404 in which the electronic device receives a next ARS service voice announcement. Otherwise, if the electronic device determines that the ARS service has ended in step 1412, then the procedure of FIG. 14 ends.

The instruction set for each step of FIG. 14 can be stored in one or more modules of the memories 705 and 707 of FIG. 7. As an example, the module stored in the memory can be executed by one or more processors.

Methods according to exemplary embodiments of the present invention can be implemented in hardware, software, or a combination thereof.

According to exemplary embodiments of the present invention, when implemented in software, a non-transitory computer readable recording medium for storing one or more programs (i.e., software modules) can be provided. The one or more programs stored in the non-transient computer readable recording medium are configured for execution performed by one or more processors in an electronic device such as a portable terminal. The one or more programs include instructions for allowing the electronic device to execute the methods based on the exemplary embodiments disclosed in the claims and/or specification of the present invention.

The program (e.g., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) other forms of optical storage devices, a magnetic cassette, the like, or a combination thereof. In addition, the memory may be configured to include a plurality of memories.

Further, the program can be stored in an attachable storage device capable of accessing the electronic device through a communication network such as the Internet, an Intranet, a Local Area Network (LAN), a Wide LAN (WLAN), a Storage Area Network (SAN), a communication network configured by combining the networks, and the like. The storage device can access via an external port to the device for performing the exemplary embodiment of the present invention.

Furthermore, an additional storage device on the communication network can access to the device for performing the exemplary embodiment of the present invention.

According to exemplary embodiments of the present invention, a proximity sensor is prevented from being enabled when a soft keypad is input during an ARS response. Accordingly, a "screen off" function which is not desired by a user may be avoided. In addition, because the "screen off" function not desired by the user is disabled during the ARS service, the user can use the ARS service of a smart phone without any inconvenience.

While the invention has been shown and described with reference to certain exemplary embodiments thereof, it will be understood that various changes in form and details may be made therein without departing from the spirit and scope of the invention as defined by the appended claims and their equivalents.

What is claimed is:

1. An electronic device comprising:
   a proximity sensor configured to detect an object in proximity to the proximity sensor;
   a display configured to operate based on a result of the detection by the proximity sensor while the proximity sensor is enabled; and
   a processor configured to control the proximity sensor to be enabled or disabled during a call selectively,
   wherein the proximity sensor is disabled according to an execution of a predefined application during the call.

2. The electronic device of claim 1, wherein the predefined application comprises an application for a memo pad.

3. The electronic device of claim 1, wherein the predefined application is executed in response to an input of a corresponding key.

4. The electronic device of claim 3, wherein the corresponding key comprises one of a hardware key or a soft key.

5. The electronic device of claim 4, wherein the soft key is displayed on the display during the call.

6. The electronic device of claim 1, wherein the call relates to an automatic response system (ARS) service.

7. The electronic device of claim 1, wherein the processor is further configured to control to display an input interface in response to the execution of the predefined application.

8. The electronic device of claim 7, wherein the input interface comprises a soft keypad.

9. The electronic device of claim 1, wherein the processor is further configured to control to disable the proximity sensor in response to an input of a predefined hardware key during the call.

10. The electronic device of claim 1, wherein the predefined application is executed in response to detecting a predefined event.

11. A method for operating an electronic device, the method comprising:
    establishing a call;
    Operating a display based on a result of a detection by a proximity sensor while the proximity sensor is enabled; and
    selectively enabling or disabling the proximity sensor during the call,
    wherein the proximity sensor is disabled according to an execution of a predefined application during the call.

12. The method of claim 11, wherein the predefined application comprises an application for a memo pad.

13. The method of claim 11, wherein the predefined application is executed in response to an input of a corresponding key.

14. The method of claim 13, wherein the corresponding key comprises one of a hardware key or a soft key.

15. The method of claim 14, wherein the soft key is displayed on the display during the call.

16. The method of claim 11, wherein the call relates to an automatic response system (ARS) service.

17. The method of claim 11, further comprising:
    displaying an input interface in response to the execution of the predefined application.

18. The method of claim 17, wherein the input interface comprises a soft keypad.

19. The method of claim 11, further comprising:
    disabling the proximity sensor in response to an input of a predefined hardware key during the call.

20. The method of claim 11, wherein the predefined application is executed in response to detecting a predefined event.

* * * * *